(12) United States Patent
Zanelato et al.

(10) Patent No.: US 9,979,326 B1
(45) Date of Patent: May 22, 2018

(54) DEVICE, SYSTEM AND METHOD FOR STARTING A SINGLE-PHASE INDUCTION MOTOR

(71) Applicant: Whirlpool S.A., Sao Paulo (BR)

(72) Inventors: Marcelo Zanelato, Joinville (BR); Marcos Roberto de Souza, Joinville (BR)

(73) Assignee: Whirlpool S.A. (BR)

( * ) Notice: Subject to any disclaimer, the term of this patent is extended or adjusted under 35 U.S.C. 154(b) by 0 days. days.

(21) Appl. No.: 15/401,708

(22) Filed: Jan. 9, 2017

(30) Foreign Application Priority Data

Nov. 10, 2016 (BR) .............................. 102016026339

(51) Int. Cl.
*H02P 1/42* (2006.01)
*H02P 25/04* (2006.01)

(52) U.S. Cl.
CPC ................ *H02P 1/42* (2013.01); *H02P 25/04* (2013.01)

(58) Field of Classification Search
USPC .................................. 318/753, 727, 786, 756
See application file for complete search history.

(56) References Cited

U.S. PATENT DOCUMENTS

| | | | |
|---|---|---|---|
| 3,593,081 A * | 7/1971 | Forst | H02P 1/42 318/792 |
| 4,361,792 A | 11/1982 | Davis, Jr. et al. | |
| 4,422,029 A * | 12/1983 | Demers | H02P 23/24 318/753 |
| 4,459,535 A * | 7/1984 | Schutten | H02P 25/04 318/807 |
| 4,801,858 A * | 1/1989 | Min | H02P 1/426 318/779 |
| 5,051,681 A | 9/1991 | Schwarz | |
| 5,053,908 A | 10/1991 | Cooper et al. | |
| 6,034,503 A | 3/2000 | Pertessis | |
| 6,320,348 B1 | 11/2001 | Kadah | |
| 7,471,058 B2 | 12/2008 | Duarte et al. | |
| 8,508,374 B1 | 8/2013 | Wolfe et al. | |
| 9,160,259 B2 | 10/2015 | Souza | |
| 9,184,678 B2 | 11/2015 | Zanelato et al. | |
| 2015/0137730 A1* | 5/2015 | Peng | H02P 1/445 318/786 |

FOREIGN PATENT DOCUMENTS

WO    WO 02/09264 A1    1/2002

* cited by examiner

*Primary Examiner* — Jorge L Carrasquillo
(74) *Attorney, Agent, or Firm* — Fay Sharpe LLP

(57) ABSTRACT

A device, system and method for starting a single-phase induction motor. The method includes: i) energizing the start winding ($50b$) and continuously estimating an operating rotation ($R_1$) of the motor throughout its operation; ii) measuring a first phase shift level ($D_1$) between at least two electrical quantities along a first stability stage ($E_1$); iii) monitoring the variation of the first phase shift level ($D_1$) according to the increase of the operating rotation of the motor along the first stability stage; iv) detecting an inflection stage ($E_{inf}$) from the first phase shift level to a second phase shift level ($D_2$), when the operating rotation is close to a regime rotation ($R_2$); v) measuring the second phase shift level ($D_2$) between at least two electrical quantities of the motor along a first stability stage ($E_2$); and vi) de-energizing the start winding when the operating rotation reaches the regime rotation.

11 Claims, 6 Drawing Sheets

Phase between the input voltage and the current in the start winding

DEVICE, SYSTEM AND METHOD FOR STARTING A SINGLE-PHASE INDUCTION MOTOR

CROSS REFERENCE TO RELATED APPLICATION

This application claims priority under 35 USC 119 to Brazilian Patent Application No. BR102016026339-5 filed Nov. 10, 2016 (Nov. 10, 2016), and the entire disclosure of said Brazilian application is hereby incorporated by reference in its entirety into the present specification.

FIELD OF INVENTION

The present invention relates to a device, system and method for starting a single-phase induction motor designed to be applied to start any type of single-phase induction motor in an adaptive manner.

BACKGROUND OF INVENTION

It is known that single-phase induction motors can be used in different applications, such as in household appliances in general, refrigerators, compressors among others, by virtue of their simplicity, robustness and performance.

Induction motors are comprised of a squirrel cage-type rotor and a stator, the latter being provided with a main winding and a start winding. During its operation, the main winding is energized by a source of alternating voltage, while the start winding is energized temporarily, thus creating a rotating magnetic field in the stator air gap, a condition that is necessary to accelerate the rotor and promote its starting.

In general, the rotating magnetic field is obtained by energizing the start winding with a time-lagged current with respect to the current in the main winding. Phase shift is preferably at an angle of 90 degrees between the currents of the windings.

As it is general knowledge to one skilled in the art, phase shift may be obtained by means of constructive characteristics of the windings or by means of an external impedance in series with the start winding. Since the value of the current circulating in the start winding is relatively high, it is observed that it is necessary to interrupt this current after a certain period of time.

Such interruption is made by means of a starting device, such as a PTC, electromechanical relay or temporizer-type starting components. Examples of these devices are cited in patent documents U.S. Pat. No. 5,053,908 and U.S. Pat. No. 5,051,681, and in the publication of the PCT international patent application WO 02/09264 A1.

In relation to the PTC, it is observed that the problem with this device relates to the optimization of the time of energizing the start winding. Its conduction time is directly proportional to the volume of the ceramic tablet and inversely proportional to the circulating current, which entails a reduced starting time when it is applied to motors having higher power and a too long time when it is applied to smaller motors. These two factors lead to starting deficiency of larger motors and a higher consumption of energy during the starting period in smaller motors.

With regard to the electromechanical relay, it is noted that this one has as main deficiency the need of dimensioning of a specific component for each size of electric motor, preventing its use in high efficiency motors.

Referring now to the temporizer-type starting components, it can be seen that these do not adapt the starting time required for different motor sizes. Their concept does not enable one to size a circuit that could provide optimized starting time for the different motor sizes, and so the existence of various models becomes necessary, each of them adjusted for a determined actuation time, so as to meet a determined family of electric motors, which will cause lack of standardization, high adjustment in the manufacturing lines and increase in stocks.

In order to correct the problems of these known devices, some solutions have been developed. For example, U.S. Pat. No. 6,320,348 discloses a starting circuit for a single-phase motor. Such a circuit is based on the measurement of electrical quantities (voltage or current) of the motor and a signal of current or voltage variation as a function of time (derivative—di/dt or dV/dt). If the signal di/dt or dV/dt is lower (or higher) at a given parameter, the start winding is disconnected.

Another solution is disclosed in U.S. Pat. No. 8,508,374 which relates to a starting circuit for a single-phase motor. In one of the proposed embodiments, it is mentioned that the control operates from monitoring the zero-crossing of the voltage/current waveforms which feeds the motor windings.

In addition, U.S. Pat. No. 4,361,792 discloses a control system based on the phase shift between current and voltage of an induction motor. This document is based on a first parameter obtained from the actual phase shift between voltage and current, a second parameter obtained from the zero-crossing of the current waveform and a third parameter representing the phase shift desired for voltage and current.

An additional solution is disclosed in U.S. Pat. No. 6,034,503 relating to a method for reconnecting the start winding of a motor. It is mentioned that the start winding is disconnected as soon as the electric current of the main winding reaches a certain value and will only be reconnected if the voltage on the start winding establishes a certain relationship with the electric current on the main winding.

Similarly, the solution disclosed in U.S. Pat. No. 9,160,259 describes a starter device configured to energize the start winding in the condition when a first voltage signal sampled from the voltage source, through a sensor, is lower than or equal to a first voltage level or is higher than or equal to a second voltage level, so as to initiate a starting period of the motor.

Another similar solution is mentioned in U.S. Pat. No. 7,471,058 which relates to a starting device in which a control unit receives from a current sensor signals relating to the current level supplied to the stator, the control unit being connected to the windings to open and close a starting switch when a ratio between the present current level supplied to the stator and the current starting level reaches a predetermined value.

Finally, the solution disclosed in U.S. Pat. No. 9,184,678 relates to a starting device for induction motors, wherein a processing device receives current signals from a current sensor and voltage signals from a current zero-crossing sensor, the processor activating and deactivating the switch according to the signals and with time sensors.

SUMMARY OF THE INVENTION

It is observed, however, that none of the above solutions discloses a device and system implemented through a startup methodology of an induction motor, wherein monitoring of motor rotation and phase between electrical quantities is performed over three stages during starting of the motor.

Such monitoring demonstrates a clear relationship between the phase variation and the increase of the motor rotation until it reaches a regime rotation, situation which is the end of the starting of the motor.

The present invention allows that an adaptive start to be carried out in any type of single-phase induction motor, so that the start winding is de-energized at the optimal moment, thus having optimization at startup and higher performance.

A methodology in which a simple starting device can be used in any type of engine is not observed either in the state of the art, there being no need for specific components for a given motor. In other words, the present invention allows for both large and small motors to have an optimal adaptive starting from the proposed methodology, regardless of the supply voltage or the load coupled to the shaft.

A first objective of the present invention is to provide a device, a system and a method of starting a single-phase induction motors which allow an optimization of starting at the optimal moment for de-energization of the start winding.

A second objective of the present invention is to provide a device, a system and a method of starting single-phase induction motors wherein monitoring of motor rotation through the phase between electrical quantities is carried out over three stages during the starting of the motor, in order to identify the optimal moment for de-energizing the start winding.

A third objective of the present invention is to provide a device, a system and a starting method for single-phase induction motors which can be used in any type of motor, there being no need for specific components for a given motor.

A final objective of the present invention is to provide a device, a system and a method of starting single-phase induction at a low cost and in simple manner, which do not require major changes for implementation.

The objectives of the present invention are achieved by means of a method for starting a single-phase induction motor, the motor being provided with a rotor and a stator, the stator being provided with a main winding and a start winding, the main winding and the start winding of the single-phase induction motor being energized by means of an alternating voltage source, the start winding being selectively activated and deactivated by a starting device, the method comprising the steps of:

i) energizing the start winding and continuously estimating an operation rotation of the single phase induction motor throughout its operation through the phase shift between at least two electrical quantities;

ii) measuring a first phase shift level between at least two electrical motor quantities along a first stage of stability;

iii) monitoring the variation of the first phase shift level according to the increase of the operation rotation of the single phase induction motor along the first stage of stability;

iv) detecting an inflection stage from the first phase shift level to a second phase shift level, when the operating rotation of the single phase induction motor is close to a regime rotation;

v) measuring the second level of phase shift between at least two electrical motor quantities along a second stage of stability after the inflection stage of the first phase shift level; and vi) de-energizing the start winding when the operating rotation reaches the regime rotation.

The objectives of the present invention are also achieved by means of a method for starting a single-phase induction motor, the motor being provided with a rotor and a stator, the stator being provided with a main winding and a start winding, the main winding and the start winding of the single-phase induction motor being energized by means of an alternating voltage source, the start winding being selectively activated and deactivated by a starting device, the method comprising the steps of:

i) energizing the start winding and continuously estimating an operating rotation of the single phase induction motor throughout its operation through the phase shift between at least two electrical quantities;

ii) measuring a first phase shift level between at least two electrical motor quantities, the first phase shift level varying according to the increase of the operating rotation of the single-phase induction motor;

iii) detecting whether the first phase shift level varies to a second phase shift level; and iv) if the response to step iii) is positive, de-energizing the start winding when the operating rotation reaches a regime rotation.

In addition, the objectives of the present invention are achieved by means of a starting system for a single-phase induction motor, the motor being provided with a rotor and a stator, the stator being provided with a main winding and a start winding, the main winding and the start winding of the single-phase induction motor being energized by means of an alternating voltage source, the start winding being selectively activated and deactivated by a starting device, the system being configured to energizing the start winding and continuously estimating an operating rotation of the single phase induction motor throughout its operation by the phase shift between at least two electrical quantities, the system being further configured to measure a first phase shift level between at least two electrical quantities of the motor and to detect whether the first phase shift level varies to a second phase shift level, the first phase shift level varying according to the increase of the operating rotation of the single-phase induction motor, the system de-energizing the start winding when the rotation of the operation reaches a regime rotation.

Finally, the objectives of the present invention are achieved by means of a starting device for a single-phase induction motor, the motor being provided with a rotor and a stator, the stator being provided with a main winding and a start winding, the main winding and the starting winding of the single-phase induction motor being energized by means of an alternating voltage source, the starting winding being selectively activated and de-activated by the starting device, the starting device being configured for energizing the start winding and continuously estimating an operating rotation of the single-phase induction motor throughout its operation throughout the phase shift between at least two electrical quantities, the starting device being further configured for measuring the variation of first phase shift level between at least two electrical quantities of the motor until the first phase shift level reaches the second phase shift level, the first phase shift level varying according to the increase of the operating rotation of the single-phase induction motor, the starting device de-energizing the start winding, when the operating rotation reaches a regime rotation.

BRIEF DESCRIPTION OF THE DRAWINGS

The present invention will be further described in more detail based on one example of embodiment represented in the drawings. The figures show.

DETAILED DESCRIPTION OF THE INVENTION

A great advantage of the present invention over the prior art is the fact that the starting method can be used in different types of single-phase induction motors, there being no need for specific components for a given motor. In other words, the present invention allows that both large and small motors to have an optimal adaptive starting from the proposed methodology, regardless of the supply voltage or the load coupled to the shaft.

In a preferred embodiment, the method of the present invention is implemented by means of a system composed of a single-phase induction motor, an alternating voltage source F and a starting device 100.

Figure 1:
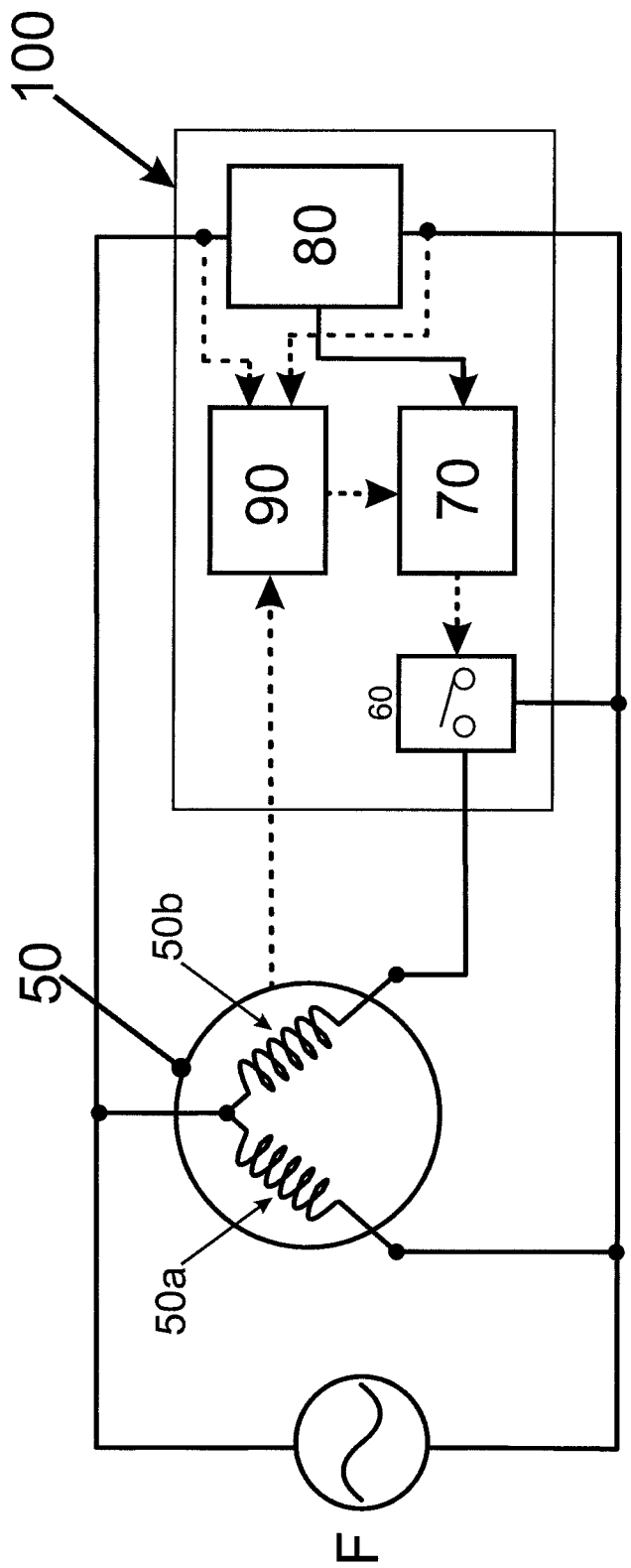
FIG. 1 illustrates a schematic view of the starting system for a single-phase induction motor object of the present invention.

As can be seen from FIG. 1, the motor is provided with a rotor (not shown) and a stator 50, the latter being provided with a main winding 50a and a start winding 50b. With respect to the alternating voltage source F, it is noted that this may be any known source of the prior art capable of supplying electrical power to the motor. Finally, the starting device 100 preferably comprises a microprocessor 70, a switch 60, a zero-crossing detection circuit 90 and a DC source 80.

Still in a preferred embodiment, the microprocessor 70 is a signal processing circuit fed by the DC source 80 and the switch 60 is a TRIAC or is formed by at least one silicon-controlled rectifier configured to selective energize and de-energize a start winding 50b. It should be noted that the electronic switches 60 are merely examples of switching components, which do not represent any obligation nor limit the invention.

The zero-crossing detection circuit 90 is configured to detect time periods, or instants, where the current or voltage of the motor crosses zero.

Still referring to FIG. 1, it is noted that this illustrates the connections of the elements described above. As can be seen, the alternating voltage source F is preferably connected in parallel with the main winding 50a for energizing thereof.

On the other hand, the start winding 50b has one of its ends electrically connected to one of the nodes of the alternating voltage source F and the other end is connected to the switch 60 of the starting device 100, the switch 60 being connected to the other node of the alternate voltage source F.

It is thus observed that the start winding 50b is only energized by the alternating voltage source F, when the switch 60 is activated, that is, when the motor is initially energized to start.

Still in connection with the connections of the system elements of the present invention, it is noted that the zero-crossing detection circuit 90 is configured to measure and monitor periods of time, or instants, in which electrical quantities, coming from the alternating voltage source F, of the main winding 50a or from the start winding 50b, cross zero.

After detecting periods of time, or instants, when the electric quantities cross zero, the microprocessor 70 calculates a first phase shift level $D_1$ between at least two electrical quantities based on the signals received from the zero-crossing detection circuit 90. If the first phase shift level $D_1$ changes in accordance with the increase of the operating rotation $R_1$ of the single-phase induction motor, the microprocessor 70 waits for the occurrence of a second phase shift level $D_2$ between at least two quantities in such a way that the latter has null variation.

The electric quantities used may be the most different, these not establishing a limiting character of the present invention. Two, three, a plurality or combinations of electrical quantities may be used in the present invention depending on the user's choice.

By way of example only, the first phase shift level $D_1$ and the second phase shift level $D_2$ can be calculated i) between the input voltage of the alternating voltage source F and the current in the main winding 50a; ii) between the input voltage of the alternating voltage source F and the current in the start winding 50b; iii) between the current in the main winding 50a and the current in the start winding 50b; iv) between the voltage in the start winding 50b and the current in the start winding 50b and so on.

The second phase shift level $D_2$ must have a significant difference from the first phase shift level $D_1$, thereby ensuring that the motor has left the locked rotor condition. The phase shift levels $D_1$ and $D_2$ vary depending on the design of the motor and the configuration thereof (with or without a starting capacitor). Starting from the value $D_1$ initially defined, a percentage value is calculated for a minimum value for $D_2$, thereby ensuring the engine acceleration.

Preferably, the microprocessor 70 is configured to selectively energize and de-energize a start winding 50b, when the operating rotation $R_1$ reaches the operating rotation $R_2$, estimated by varying the phase shift levels $D_1$ and $D_2$, as will be better described below.

As outlined above, the starting system described above has been developed to optimize startup through a single starting device 100, which can carry out startup of different types of single-phase induction motors. The starting device 100 allows that an adaptive startup is carried out in any type of a single-phase induction motor, whether they are motors requiring longer connection time or shorter connection time with start winding 50b.

Figure 2:
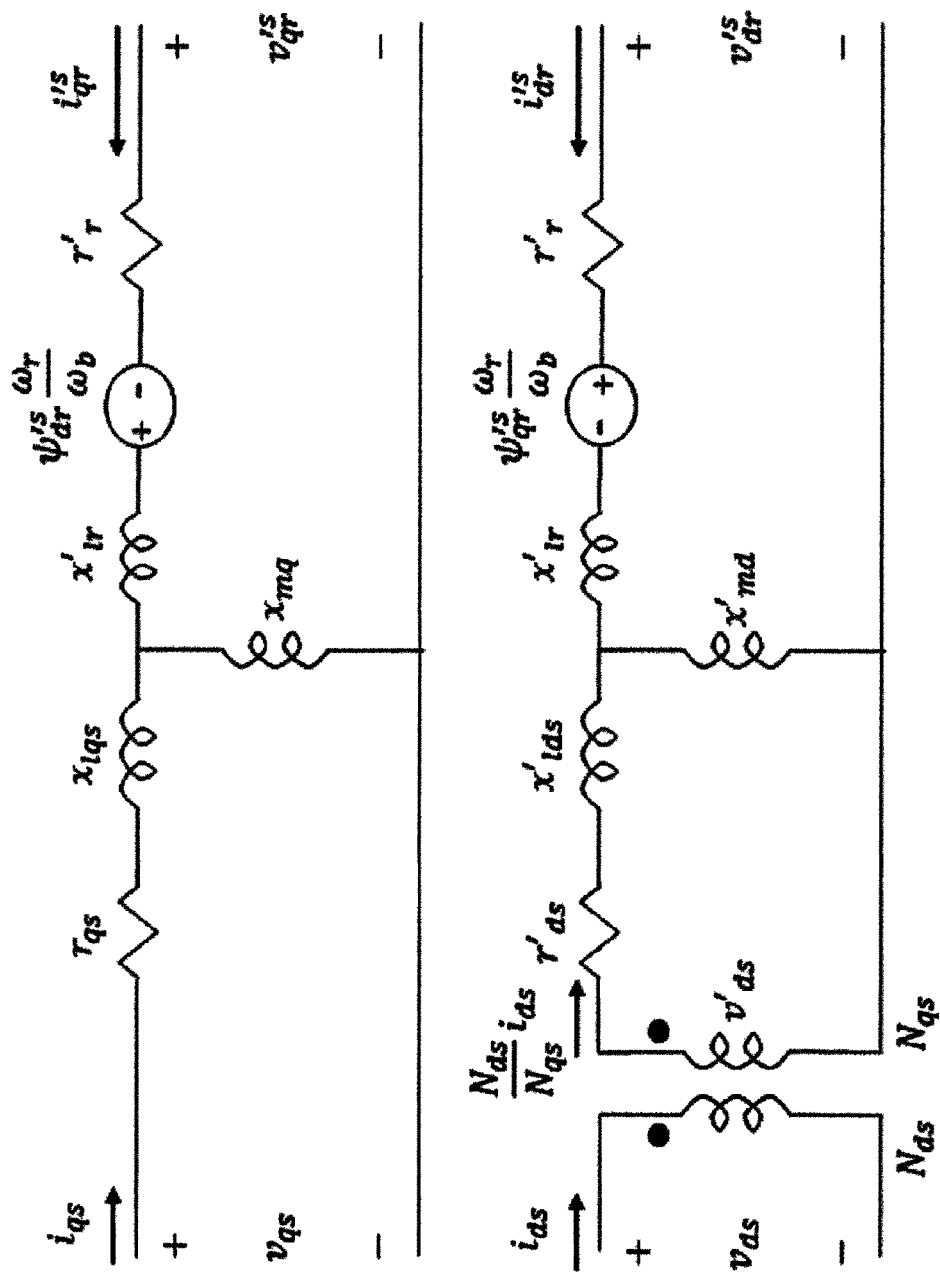
FIG. 2 illustrates the equivalent circuit of a single-phase induction motor.

For a better understanding of the present invention, it is important to refer to the equivalent circuit of a single-phase induction motor shown in FIG. 2. As can be seen, the variable elements are the input voltage, rotor speed, and load torque (not shown). Since the input voltage and the load torque are practically constant during the starting period of the motor, it is noted that the phase relationship between electric quantities (voltages and currents) depends only on the variation of the motor speed.

Figure 3:
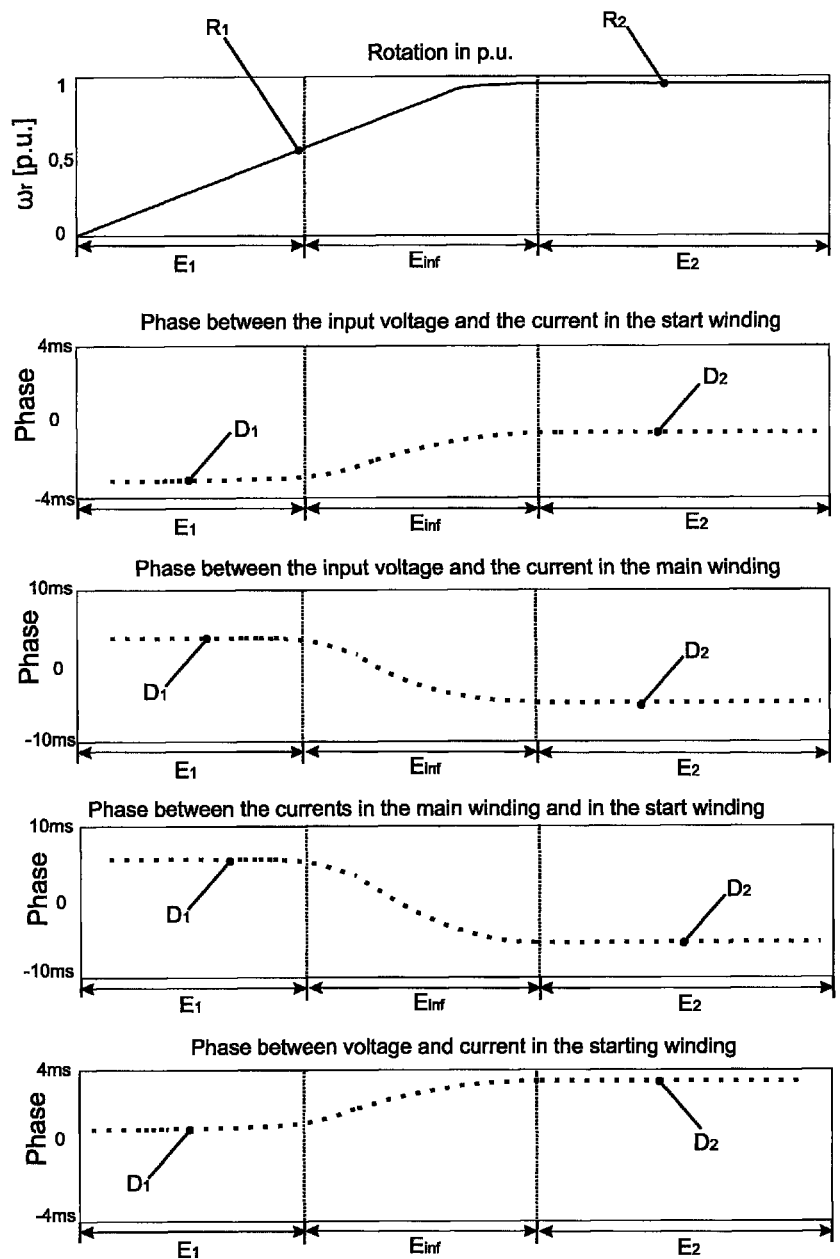
FIG. 3 represents graphs of the rotation and of the phase behavior between the motor electrical quantities over a first stage of stability, an inflection stage and a second stability stage, the graphs demonstrating a clear relationship between the phase variation and the increase of the motor rotation until it reaches a regime rotation, situation which constitutes the starting of the motor.

Taking into account such a condition, it is noted that the present invention has the advantage of monitoring the rotation of the motor through the phase between electrical quantities over three stages during the starting of the motor. The simulations of FIG. 3 represents graphs of the rotation and of the phase behavior between the motor electrical quantities over a first stage of stability $E_1$, an inflection stage $E_{inf}$ and a second stability stage $E_2$, the graphs demonstrating a clear relationship between the phase variation and the increase of the motor rotation until it reaches a regime rotation, situation which constitutes the starting of the motor.

It can be observed that in the first stage of stability $E_1$, the first phase shift level $D_1$ is practically constant, while the operating rotation $R_1$ of the single-phase induction motor increases. As clearly shown in FIG. 4, this stage is the beginning of the starting period of the motor, situation in which the switch 60 is already closed from the start, for energizing the start winding 50b. Preferably, the first stage of stability $E_1$ is between 0% and 40% of the total time of a startup under normal conditions of supply voltage and load.

Figure 5:
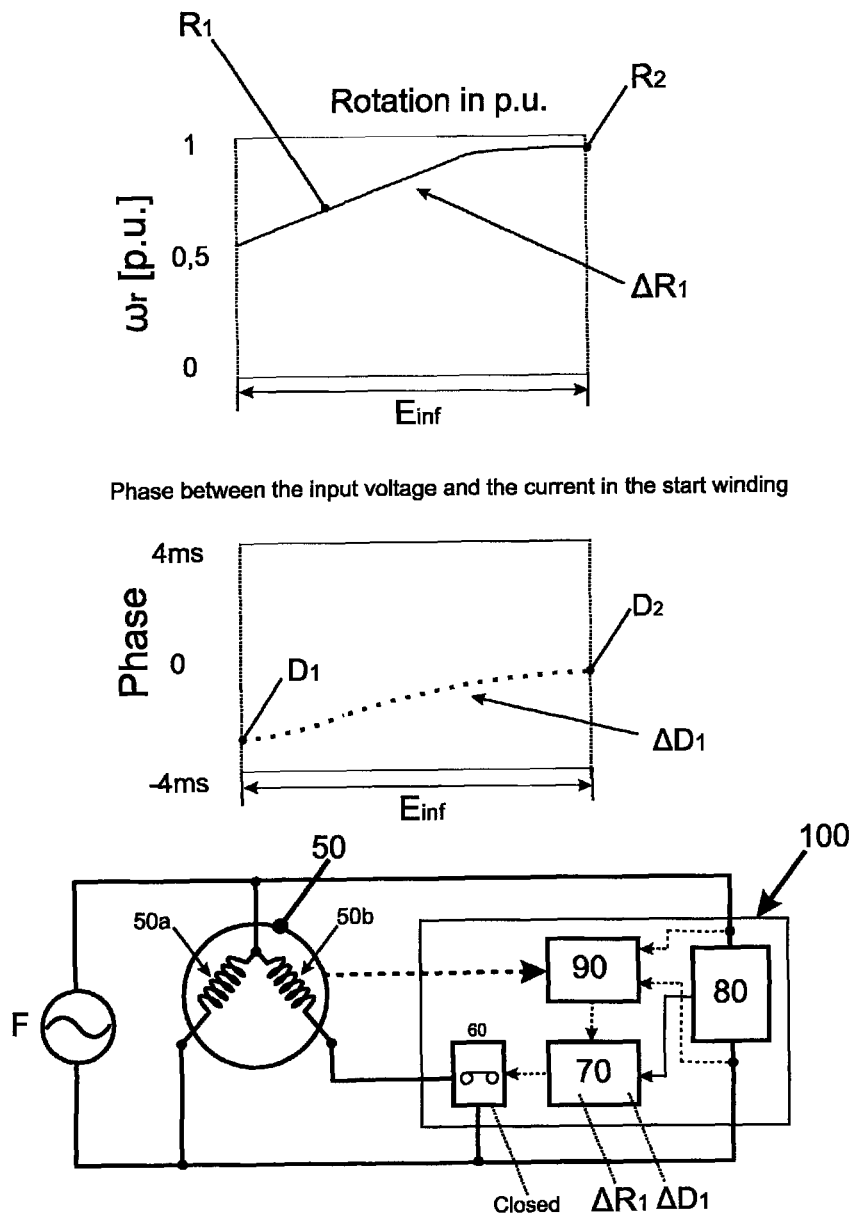
FIG. 5 illustrates graphs of the rotation and phase behavior between motor electrical quantities along an inflection state, as well as the starting system object of the present invention prior to starting the motor (start winding energized)

Referring now to FIG. 5, it can be noted that in the inflection stage $E_{inf}$ the first phase shift level $D_1$ begins to vary significantly, for example, after the operating rotation $R_1$ of the single-phase induction motor reaches about 50% of the regime rotation $R_2$. The first phase shift level $D_1$ reaches the second phase shift level $D_2$ when the operating rotation $R_1$ is close to the regime rotation $R_2$. As clearly shown in FIG. 5, this stage is the intermediate period of startup of the motor, situation in which the switch 60 is still closed for energizing the start winding 50b. Preferably, the inflection stage $E_{inf}$ lasts between 40% and 90% of the total starting time. Alternatively, the inflection stage $E_{inf}$ can be obtained by a minimum waiting time between the first stage of stability ($E_1$) and the second stage of stability ($E_2$).

Figure 6:
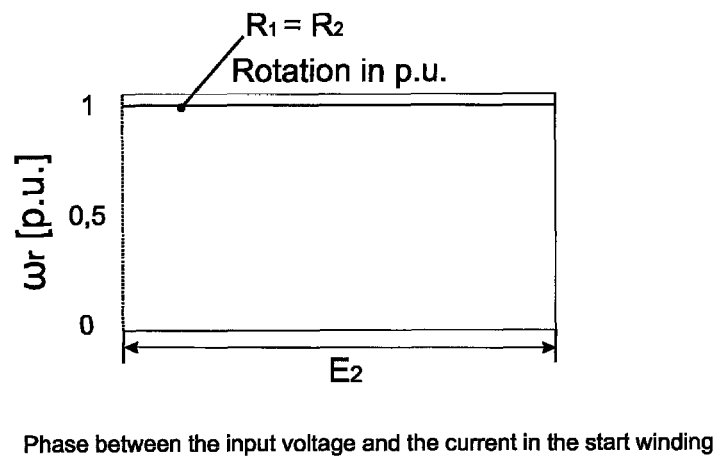
FIG. 6 illustrates graphs of the rotation and phase behavior between motor electrical quantities along a second stage of stability, as well as the starting system object of the present invention prior to starting the motor (start winding de-energized).
Figure 6:
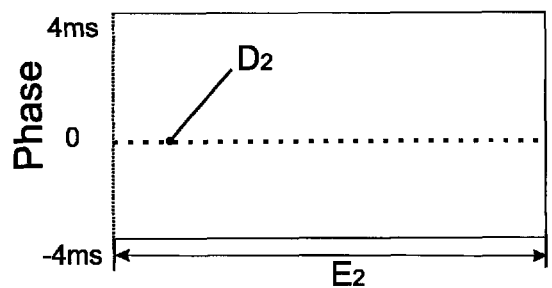
Figure 6:
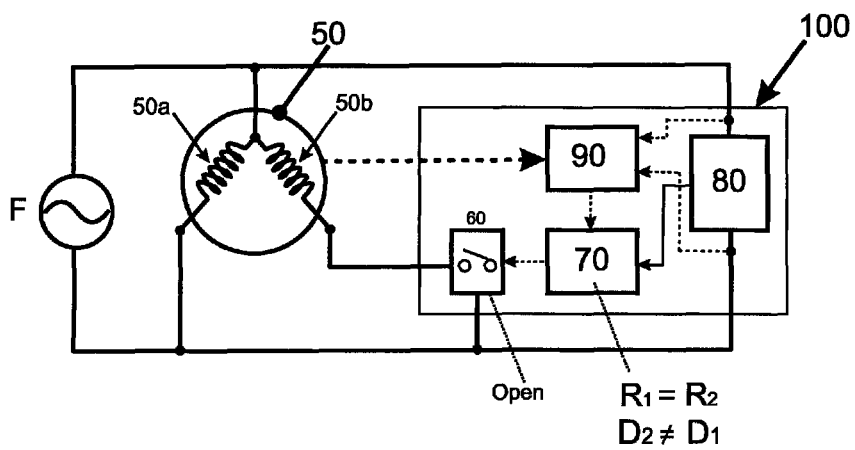

Finally, one can note from FIG. 6 that, in the second stability stage $E_2$, the operating rotation $R_1$ of the single-phase induction motor preferably reaches the regime rotation $R_2$, which is very close to the synchronous rotation of the motor. The operating rotation $R_1$ and the second phase shift level $D_2$ remain constant along the second stabilization stage $E_2$. As clearly shown in FIG. 6, this stage is the end of the motor starting period, situation in which the switch 60 opens for de-energization of the start winding 50b. Preferably, the second stability stage $E_2$ lasts between 90% and 100% of the total starting time.

Figure 4:
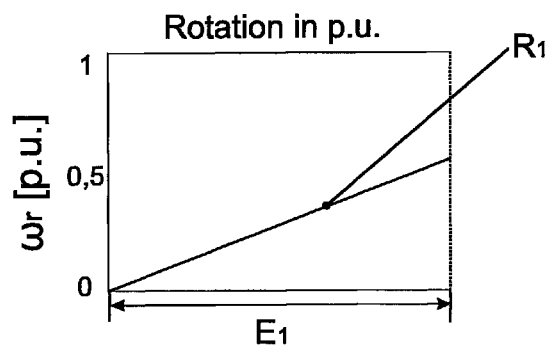
FIG. 4 illustrates graphs of the rotation and phase behavior between motor electrical quantities along a first stage of stability, as well as the state of the starting system object of the present invention prior to starting the motor (start winding energized).
Figure 4:
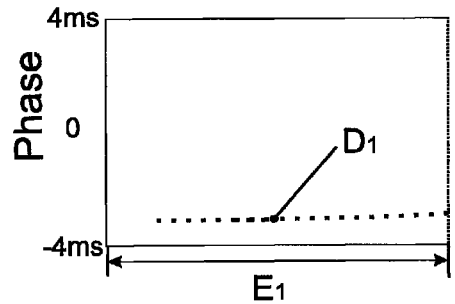
Figure 4:
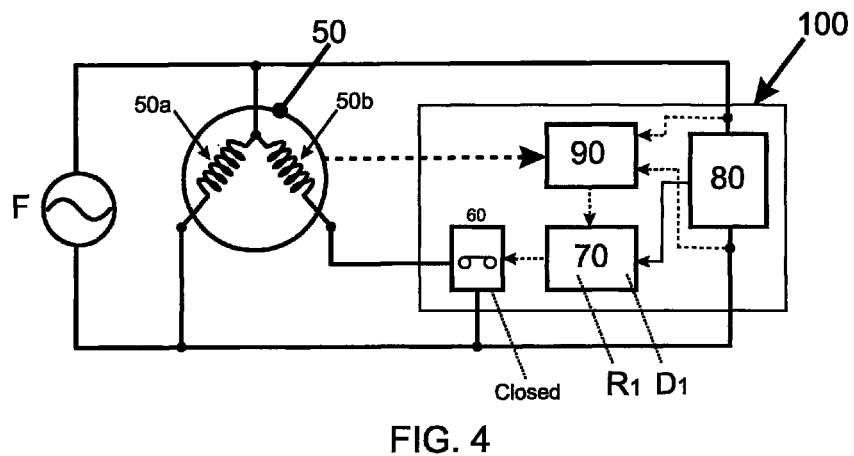

Considering the three stages of the starting time above the single-phase induction motor, it is observed that the system is operated in the following manner:

Initially, the single-phase induction motor is energized, which is the beginning of the first stability stage $E_1$, the main winding 50a and the start winding 50b being energized by means of an alternating voltage source F, the start winding 50b being initially energized by the switch 60 of the starting device 100. The microprocessor 70 continuously estimates the operating rotation $R_1$ of the single-phase induction motor through the signals received from the zero-crossing detection circuit 90, the microprocessor 70 defining the first phase shift level $D_1$ between at least two electrical quantities of the motor, as shown in FIG. 4 (first stability stage $E_1$).

The microprocessor 70 is further configured to verify whether the first phase shift level $D_1$ has varied to a second phase shift level $D_2$, when the operating rotation $R_1$ of the single-phase induction motor is close to a regime rotation $R_2$, As illustrated in FIG. 5 (inflection stage $E_{inf}$);

During the inflection stage $E_{inf}$, the microprocessor 70 determines whether the first phase shift level $D_1$ is different from the second phase shift level $D_2$. If that is true (FIG. 6—second stability stage $E_2$), the microprocessor 70 remains estimating the operating rotation $R_1$ of the single-phase induction motor until it preferably achieves the regime rotation $R_2$. The microprocessor 70 generates command signals and sends them to the switch 60, the latter being opened so as to de-energize the start winding 50b. The end of the second stage of stability $E_2$ establishes the end of the start period of the single-phase induction motor.

After one example of a preferred embodiment has been described, it should be understood that the scope of the present invention encompasses other possible embodiments and is limited only by the content of the appended claims, which include their possible equivalents.

The invention claimed is:

1. A method of starting a single-phase induction motor, the motor comprising a rotor and a stator (50), the stator comprising a main winding (50a) and a starting winding (50b), the main winding (50a) and the starting winding (50b) being energized by means of an alternating voltage source (F), the starting winding (50b) being selectively activated and deactivated by a starting device (100) comprising a microprocessor (70), the method comprising the steps of:
   i) energizing the start winding (50b) and using the microprocessor (70) to continuously estimate an operating rotation ($R_1$) of the single-phase induction motor throughout its operation through the phase shift between at least two electrical quantities;
   ii) using the microprocessor (70) to measure a first phase shift level ($D_1$) between at least two electrical quantities of the motor along a first stability stage ($E_1$);
   iii) monitoring the variation of the first phase shift level ($D_1$) according to the increase of the operating rotation ($R_1$) of the single-phase induction motor along the first stability stage ($E_1$);
   iv) detecting an inflection stage ($E_{inf}$) from the first phase shift level ($D_1$) to a second phase shift level ($D_2$), when the operating rotation ($R_1$) of the single-phase induction motor is close to a regime rotation ($R_2$);
   v) using the microprocessor (70) to measure the second phase shift level ($D_2$) between at least two electrical quantities of the motor along a second stability stage ($E_2$), after the inflection stage ($E_{inf}$) of the first phase shift level ($D_1$); and
   vi) de-energizing the start winding (50b) when the operating rotation ($R_1$) reaches the regime rotation ($R_2$).

2. The method according to claim 1, wherein the starting device (100) further comprises a switch (60) and a zero-crossing detection circuit (90).

3. The method according to claim 2, wherein the steps ii) to v) of measuring and monitoring the first phase shift level ($D_1$) and measuring the second phase shift level ($D_2$) between at least two electrical quantities of the motor are performed by means of the zero-crossing circuit (90) of the start device (100) and of the microprocessor (70).

4. The method according to claim 3, further comprising an intermediate step between steps v) and vi) of determining whether the first phase shift level ($D_1$) is different from the second phase shift level ($D_2$).

5. The method according to claim 2, wherein the microprocessor 70 sends the command signals to the switch (60).

6. The method according to claim 5, wherein the switch (60) comprises a TRIAC.

7. The method according to claim 5, wherein the switch (60) comprises at least one silicon-controlled rectifier.

8. The method according to claim 5, wherein the switch (60) remains initially activated before starting of the single-phase induction motor.

9. The method according to claim 1, wherein the at least two electrical quantities of the motor of the first phase shift level ($D_1$) and the second phase shift level ($D_2$) are selected from a group comprising: input voltage of the alternating voltage source (F), input current of the alternating voltage source (F), voltage in the main winding (50a), current in the main winding (50a), voltage in the start winding (50b) and current in the start winding (50b), the voltage between the main winding (50a) and the start winding (50b).

10. A system of starting a single-phase induction motor, the motor comprising a rotor and a stator (50), the stator comprising a main winding (50a) and a start winding (50b), the main winding (50a) and the start winding (50b) being energized by means of an alternating voltage source (F), the start winding (50b) being selectively activated and de-activated by a starting device (100), wherein the system is configured to energize the start winding (50b) and continuously estimating an operating rotation ($R_1$) of the single-phase induction motor throughout its operation through the phase shift between at least two electrical quantities, the system comprising a microprocessor (70), the microprocessor (70) being further configured to measure a first phase shift level ($D_1$) between at least two electrical quantities of the motor along a first stability stage ($E_1$) and to detect an inflection stage ($E_{inf}$) from the first phase shift level ($D_1$) to a second phase shift level ($D_2$), when the operating rotation ($R_1$) of the single-phase induction motor is close to a regime rotation ($R_2$), the first phase shift level ($D_1$) varying according to the increase of the operating rotation ($R_1$) of the single-phase induction motor, the system being further configured to measure, by means of the microprocessor (70), the second phase shift level ($D_2$) between at least two electrical quantities of the motor along a second stability stage ($E_2$), after the inflection stage ($E_{inf}$) of the first phase shift level ($D_1$), and configured to de-energize the start winding (50b) when the operating rotation ($R_1$) reaches a regime rotation ($R_2$).

11. A starting device (100) for a single-phase induction motor, the motor comprising a rotor and a stator (50), the stator comprising a main winding (50a) and a starting winding (50b), the main winding (50a) and the starting winding (50b) being energized by means of an alternating voltage source (F), the starting winding (50b) being selectively activated and de-activated by the starting device (100), the starting device (100) comprising a microprocessor (70), the microprocessor (70) being configured to energize the start winding (50b) and continuously estimate an operating rotation ($R_1$) of the single-phase induction motor throughout its operation throughout the phase shift between at least two electrical quantities, the starting device (100) being further configured to measure, during a first stability phase ($E_1$), the variation of first phase shift level ($D_1$) between at least two electrical quantities of the motor until the first phase shift level ($D_1$) reaches the second phase shift level ($D_2$) along an inflection stage ($E_{inf}$), when the operating rotation ($R_1$) of the single-phase induction motor is close to a regime rotation ($R_2$), the first phase shift level ($D_1$) varying according to the increase of the operating rotation ($R_1$) of the single-phase induction motor, and the starting device (100) being further configured to measure, by means of the microprocessor (70), the second phase shift level ($D_2$) between at least two electrical quantities of the motor along a second stability stage ($E_2$), after the inflection stage ($E_{inf}$) of the first phase shift level ($D_1$), and the starting device (100) de-energizing the start winding (50b), when the operating rotation ($R_1$) reaches a regime rotation ($R_2$).

* * * * *